United States Patent [19]

Morita et al.

[11] Patent Number: 5,492,945
[45] Date of Patent: Feb. 20, 1996

[54] CURED SILICONE POWDER AND PROCESS FOR THE PREPARATION THEREOF

[75] Inventors: Yoshitsugu Morita; Atsushi Sasaki, both of Chiba; Noriyasu Yokoyama, Tokyo, all of Japan

[73] Assignee: Dow Corning Toray Silicone Co., Ltd., Tokyo, Japan

[21] Appl. No.: 314,484

[22] Filed: Sep. 28, 1994

[30] Foreign Application Priority Data

Oct. 6, 1993 [JP] Japan ................................. 5-274894

[51] Int. Cl.⁶ ................................................. C08K 9/00
[52] U.S. Cl. ..................... 523/212; 523/216; 523/220; 524/492; 524/493; 524/588; 525/103; 528/15; 528/31; 528/32
[58] Field of Search ............................. 523/212, 216, 523/220; 524/492, 493, 588; 528/15, 31, 32; 525/103

[56] References Cited

U.S. PATENT DOCUMENTS

| | | | |
|---|---|---|---|
| 4,742,145 | 5/1988 | Saito et al. | 524/588 |
| 4,743,670 | 5/1988 | Yoshida et al. | 528/15 |
| 5,064,894 | 11/1991 | Desmonceau | 524/503 |
| 5,153,238 | 10/1992 | Bilgrien | 523/211 |
| 5,176,960 | 1/1993 | Shimizu et al. | 523/216 |
| 5,246,982 | 9/1993 | Inoue et al. | 523/212 |
| 5,370,892 | 12/1994 | El-Nokaly et al. | 426/531 |
| 5,387,624 | 2/1995 | Morita et al. | 523/220 |

FOREIGN PATENT DOCUMENTS

| | | | |
|---|---|---|---|
| 548969 | 6/1993 | European Pat. Off. . | |
| 598627 | 5/1994 | European Pat. Off. | 524/493 |
| 70558 | 3/1989 | Japan . | |
| 348143 | 2/1992 | Japan . | |
| 5-59284 | 3/1993 | Japan | 524/588 |
| 179144 | 7/1993 | Japan . | |

*Primary Examiner*—Mark D. Sweet
*Attorney, Agent, or Firm*—Alexander Weitz

[57] ABSTRACT

There is disclosed a process comprising
(I) preparing a water-based dispersion of
  (A) a cured silicone powder having an average particle diameter of 0.1 to 200 micrometers and
  (B) an amorphous silica micropowder that has an average particle diameter not exceeding 1 micrometer and a surface silanol group density of at least 2 silanol groups per 100 square angstroms;
(II) heating said water-based dispersion; and
(III) removing the water from said dispersion, thereby producing a cured silicone rubber composition wherein the silica micropowder is immobilized on the surface of the cured silicone powder.

19 Claims, No Drawings

CURED SILICONE POWDER AND PROCESS FOR THE PREPARATION THEREOF

FIELD OF THE INVENTION

The invention relates to cured silicone powder and to a process for the preparation thereof. More specifically, the invention relates to a highly flowable and highly dispersible cured silicone powder that has little tendency to aggregate or undergo blocking. The invention also relates to a process for preparing said cured silicone powder.

BACKGROUND OF THE INVENTION

Cured silicone powders are used as additives in cosmetics, paints, inks, thermosetting organic resins, thermoplastic organic resins, and so forth. They are highly qualified for use as internal stress-relaxing agents for thermosetting (i.e., non-silicone) organic resins and as surface lubricants for organic resin films. Cured silicone powders of this type can be fabricated, for example, by first preparing the water-based emulsion of a curable silicone composition (hereinafter also referred to as a water-based curable SC emulsion), then curing the composition to form the water-based dispersion of a cured silicone powder, and finally removing the water from the water-based dispersion (refer to Japanese Laid Open Patent Application Numbers Sho 63-77942 and Sho 64-70558).

However, the cured silicone powders prepared by the methods taught in Japanese Laid Open Patent Application Numbers Sho 63-77942 and Sho 64-70558 exhibit a poor fluidity and substantial aggregation and blocking tendencies Moreover, these cured silicone powders are poorly dispersible in organic resins and organic solvents.

In response to these problems, Japanese Laid Open Patent Application Number Hei 4-348143 proposes a cured silicone powder whose surface has been coated with a metal oxide micropowder, for example, with silicon oxide. The same application also proposes a method for preparing this cured silicone powder in which a metal oxide sol (e.g., a silicon oxide sol), is added to the water-based dispersion of a cured silicone powder (hereinafter also referred to as a water-based cured SP dispersion) and the resulting mixture is then dewatered. On the other hand, Japanese Laid Open Patent Application Number Hei 5-179144 proposes to solve the aforementioned problems through a method for the preparation of a powder mixture that consists of dewatering the water-based dispersion of a cured silicone powder plus an inorganic micropowder.

The cured silicone powder taught in Japanese Laid Open Patent Application Number Hei 4-348143 is, nevertheless, associated with several drawbacks. Thus, this cured silicone powder still exhibits an inadequate behavior with regard to blocking. Moreover, since it is prepared using a metal oxide sol, the final cured silicone powder product has a high ionic impurity content. Another drawback is that the metal oxide micropowder is readily shed by the cured silicone powder when the powder is subjected to shear force. Comparative Example 2 in Japanese Laid Open Patent Application Number Hei 4-348143 describes the production of cured silicone powder by dewatering a water-based dispersion prepared by the addition of amorphous silica micropowder to a water-based cured SP dispersion. However, this particular cured silicone powder still exhibits inadequate flow, dispersion, aggregation, and blocking characteristics because the amorphous silica micropowder is adhered in a simple manner on the surface of the cured silicone powder. Moreover, this cured silicone powder also readily sheds the amorphous silica micropowder when subjected to shear force. In the case of the method for preparing a powder mixture that is disclosed in Japanese Laid Open Patent Application Number Hei 5-179144, the resulting powder mixture is nothing more than a simple mixture of the cured silicone powder and inorganic micropowder, and as a result it again exhibits inadequate flow, dispersion, aggregation, and blocking characteristics. Another drawback in this case is that the inorganic micropowder readily separates from the powder mixture.

SUMMARY OF THE INVENTION

Specifically, the present invention takes as an object the introduction of a highly flowable and highly dispersible cured silicone powder that exhibits little tendency to aggregate.

The present invention therefore relates to a composition comprising (A) a cured silicone powder having an average particle diameter of 0.1 to 200 micrometers that has immobilized on its surface (B) an amorphous silica micropowder that has an average particle diameter not exceeding 1 micrometer and a surface silanol group density of at least 2 silanol groups per 100 square angstroms.

The process of the present invention also relates to the preparation of the above described composition wherein said method is characterized by heating a water-based suspension of a powder mixture that is composed of the above described component (A) and (B), and removing the water from said suspension.

DETAILED DESCRIPTION OF THE INVENTION

The characteristic feature of the composition of the invention consists of the anchorage or immobilization of the amorphous silica micropowder (B) on the surface of the cured silicone powder (A). Component (A) in the cured silicone powder of the invention must be a cured silicone powder with an average (number average) particle diameter of about 0.1 to about 200 micrometers. The basis for this range is as follows: the amorphous silica micropowder (B) does not become satisfactorily anchored or immobilized on the surface of a component (A) having an average particle diameter below 0.1 micrometer, while the final cured silicone powder product has a strongly reduced fluidity and dispersibility when component (A) has an average particle diameter in excess of 200 micrometers. The nature of component (A) is not critical, and it may be, for example, a gel, rubber, or cured resin, with rubbers being preferred. The shape of component (A) is also not critical, and it may be, for example, spherical or disk-shaped or have an amorphous shape. A spherical shape is preferred.

Component (B) in the cured silicone powder of the invention is an amorphous silica micropowder that has an average particle diameter not exceeding about 1 micrometer and a surface silanol group density of at least 2 silanol groups per 100 square angstroms. Component (B) will not become strongly anchored on the surface of the cured silicone powder (A) when the average particle diameter of component (B) exceeds 1 micrometer or when its surface silanol group density is less than 2 silanol groups per 100 square angstroms. The shape of component (B) is not critical, but it is preferably spherical. The amorphous silica micropowder comprising the subject component (B) is exemplified by dry-process, electric arc, and wet-process amorphous silica micropowders. Fumed silica, which is prepared by a dry process, is particularly preferred as component (B).

The initial step in the preparative process according to the present invention consists of the preparation of a water-based dispersion of the cured silicone powder (A). In one example of the preparation of the water-based dispersion of component (A), a curable silicone composition is first formulated into its water-based emulsion and the particles of curable silicone composition in the emulsion are then cured.

Any heretofore known curable silicone composition may be employed as the curable silicone composition used in the preparative process according to the present invention. Examples of said curable silicone composition are addition reaction-curing silicone compositions, condensation reaction-curing silicone compositions, organoperoxide-curing silicone compositions, and ultraviolet-curing silicone compositions. Addition reaction-curing and condensation reaction-curing silicone compositions are preferred for their ease of handling.

The addition reaction-curing silicone compositions are exemplified by compositions that contain, as essential components, (a) organopolysiloxane having at least 2 alkenyl groups in each molecule, (b) organohydrogenpolysiloxane having at least 2 silicon-bonded hydrogen atoms in each molecule, and (c) platinum catalyst, and, as optional components, (d) filler and (e) epoxy-functional organic compound or aryl group-containing organic compound.

Component (a) is the base component of such addition reaction-curing silicone compositions, and it consists of organopolysiloxane having at least 2 alkenyl groups in each molecule. The alkenyl group in component (a) is specifically exemplified by vinyl, allyl, propenyl, butenyl, pentenyl, hexenyl, and decenyl, the vinyl group being preferred. The alkenyl group may be bonded at any position in the component (a) molecule, but is preferably bonded at the molecular chain terminals because this affords a particularly good curability. The non-alkenyl silicon-bonded organic groups in component (a) are specifically exemplified by monovalent hydrocarbon groups, e.g., alkyl groups such as methyl, ethyl, propyl, butyl, and so forth; cycloalkyl groups such as cyclopentyl, cyclohexyl, and so forth; aryl groups such as phenyl, tolyl, xylyl, and so forth; aralkyl groups such as benzyl, phenethyl, 3-phenylpropyl, and so forth; and halohydrocarbon groups such as 3-chloropropyl, 3,3,3-trifluoropropyl, and so forth. The molecular structure of component (a) is not critical and is exemplified by straight chain, cyclic, network, partially branched straight chain, and mixtures of such structures. Straight chain structures are preferred for the preparation of cured product in gel or rubber form. The viscosity of component (a) at 25° C. is not specifically restricted, and component (a) may have any viscosity that will permit the formation of a water-based emulsion of the addition reaction-curing silicone composition. In specific terms, the viscosity may range from 1 centipoise to that of high-viscosity gums. Preferred viscosities fall in the range of 20 to 100,000 centipoise and particularly preferred viscosities fall in the range of 20 to 10,000 centipoise.

Component (b) is a crosslinker for the subject addition reaction-curing silicone composition, and it consists of organohydrogenpolysiloxane having at least 2 silicon-bonded hydrogen atoms in each molecule. The silicon-bonded organic groups in component (b) are specifically exemplified by monovalent hydrocarbon groups, e.g., alkyl groups such as methyl, ethyl, propyl, butyl, and so forth; cycloalkyl groups such as cyclopentyl, cyclohexyl, and so forth; aryl groups such as phenyl, tolyl, xylyl, and so forth; aralkyl groups such as benzyl, phenethyl, 3-phenylpropyl, and so forth; and halohydrocarbon groups such as 3-chloropropyl, 3,3,3-trifluoropropyl, and so forth. The silicon-bonded hydrogen may be bonded at any position in the component (b) molecule. The molecular structure of component (b) is not critical and is exemplified by straight chain, cyclic, network, partially branched straight chain, and mixtures of such structures. The viscosity of component (b) at 25° C. is not specifically restricted, and component (b) may have any viscosity that will permit the formation of a water-based emulsion of the addition reaction-curing silicone composition. In specific terms, viscosities in the range of 1 to 10,000 centipoise are preferred. The quantity of component (b) used in the subject addition reaction-curing silicone composition is not specifically restricted as long as it is added in a quantity sufficient to induce the cure of the addition reaction-curing silicone composition. The specifically preferred level is 0.3 to 100 weight parts of component (b) per 100 weight parts of component (a).

Component (c) in the subject addition reaction-curing silicone composition is a platinum catalyst whose purpose is to accelerate the addition reaction between the alkenyl groups in component (a) and the silicon-bonded hydrogen atoms in component (b). The known platinum catalysts can be used as component (c), and this component is specifically exemplified by chloroplatinic acid, alcohol solutions of chloroplatinic acid, chloroplatinic acid-olefin complexes, chloroplatinic acid-alkenylsiloxane complexes, platinum black, and platinum-on-silica. The quantity of component (c) addition to the subject addition reaction-curing silicone composition is not specifically restricted as long as it is added in a quantity sufficient to accelerate the addition reaction in the addition reaction-curing silicone composition. The specifically preferred addition is about $1\times10^{-7}$ to about $1\times10^{-3}$ weight parts as platinum metal in component (c) per 100 weight parts component (a).

A filler (d) can be added on an optional basis to the subject addition reaction-curing silicone composition in order to adjust the fluidity of the composition and/or improve the mechanical strength of the cured silicone powder product. This component (d) is specifically exemplified by reinforcing fillers such as precipitated silica, fumed silica, calcined silica, fumed titanium oxide, and so forth, and by nonreinforcing fillers such as quartz powder, diatomaceous earth, aluminosilicates, iron oxide, zinc oxide, calcium carbonate, and so forth. Component (d) may be added directly to the addition reaction-curing silicone composition, or it may be added after a preliminary surface treatment with an organosilicon compound such as hexamethyldisilazane, trimethylchlorosilane, polydimethylsiloxane, and so forth.

In order to improve the affinity and adherence between organic resins and compositions of the invention, the subject addition reaction-curing silicone composition may optionally contain a component (e) that consists of an epoxy-functional or aryl group-containing organic compound. The epoxy-functional organic compounds encompassed by component (e) are specifically exemplified by allyl glycidyl ether, vinylcyclohexene monoxide, glycidyl acrylate, glycidyl methacrylate, and compounds having the following formulas:

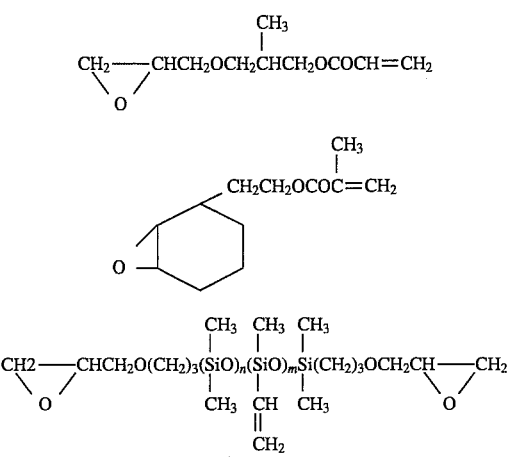

where n and m are each positive integers.

The aryl group-containing organic compounds encompassed by component (e) are specifically exemplified by the following, in which —$C_6H_5$ represents the phenyl group.

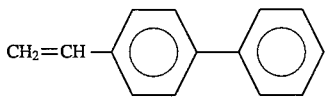

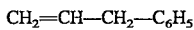

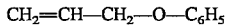

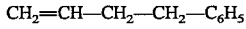

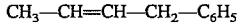

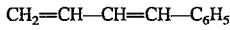

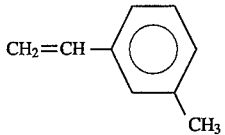

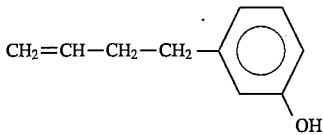

Component (e) may be added to the mixing process for components (a), (b), and (c) or it may be preliminarily reacted with component (b). The quantity of component (e) addition to the subject addition reaction-curing silicone composition is not critical, and component (e) should be added in the particular quantity that provides an excellent affinity between the cured silicone powder product and organic resins. The specifically preferred range is 0.1 to 50 weight parts per 100 weight parts component (a).

In order to control the cure rate, the subject addition reaction-curing silicone composition may contain a small quantity of an addition reaction inhibitor, such as an acetylenic compound, a hydrazine, a triazole, a phosphine, a mercaptan, and so forth. Other components that may be added to the subject addition reaction-curing silicone composition on an optional basis are pigments, heat stabilizers, flame retardants, photosensitizers, and diorganopolysiloxane that carries alkenyl only at one molecular chain terminal.

The condensation reaction-curing silicone compositions cited above as preferred are exemplified by compositions that contain, as essential components, (a') silanol-endblocked organopolysiloxane, (b') organohydrogenpolysiloxane having at least 2 silicon-bonded hydrogen atoms in each molecule, and (c') condensation-reaction catalyst, and, as optional components, (d') filler and (e') silane coupling agent.

Component (a') is the base component of such condensation reaction-curing silicone compositions, and it consists of silanol-endblocked organopolysiloxane. The silicon-bonded organic groups in component (a') are specifically exemplified by monovalent hydrocarbon groups, e.g., alkyl groups such as methyl, ethyl, propyl, butyl, and so forth; alkenyl groups such as vinyl, allyl, propenyl, butenyl, pentenyl, hexenyl, decenyl, and so forth; cycloalkyl groups such as cyclopentyl, cyclohexyl, and so forth; aryl groups such as phenyl, tolyl, xylyl, and so forth; aralkyl groups such as benzyl, phenethyl, 3-phenylpropyl, and so forth; and halohydrocarbon groups such as 3-chloropropyl, 3,3,3-trifluoropropyl, and so forth. The molecular structure of component (a') is not critical and is exemplified by straight chain, cyclic, network, partially branched straight chain, and mixtures of such structures. Straight chain structures are preferred for the preparation of cured product in gel or rubber form. The viscosity of component (a') at 25° C. is not specifically restricted, and component (a') may have any viscosity that will permit the formation of a water-based emulsion of the condensation reaction-curing silicone composition. In specific terms, the viscosity will range from 1 centipoise to that of high-viscosity gums. Preferred viscosities fall in the range of 20 to 100,000 centipoise and particularly preferred viscosities fall in the range of 20 to 10,000 centipoise.

Component (b') is a crosslinker for the subject condensation reaction-curing silicone composition, and it consists of organohydrogenpolysiloxane having at least 2 silicon-bonded hydrogen atoms in each molecule. The silicon-bonded organic groups in component (b') are specifically exemplified by monovalent hydrocarbon groups, e.g., alkyl groups such as methyl, ethyl, propyl, butyl, and so forth; cycloalkyl groups such as cyclopentyl, cyclohexyl, and so forth; aryl groups such as phenyl, tolyl, xylyl, and so forth; aralkyl groups such as benzyl, phenethyl, 3-phenylpropyl, and so forth; and halohydrocarbon groups such as 3-chloropropyl, 3,3,3-trifluoropropyl, and so forth. The silicon-bonded hydrogen may be bonded at any position in the component (b') molecule. The molecular structure of component (b') is not critical and is exemplified by straight chain, cyclic, network, partially branched straight chain, and mixtures of such structures. Straight-chain structures are preferred. The viscosity of component (b') at 25° C. is not specifically restricted, and component (b') may have any viscosity that will permit the formation of a water-based emulsion of the condensation reaction-curing silicone composition. In specific terms, viscosities in the range of 1 to 10,000 centipoise are preferred. The quantity of component (b') addition to the subject condensation reaction-curing silicone composition is not specifically restricted as long as it is added in a quantity sufficient to induce the cure of the condensation reaction-curing silicone composition. The specifically preferred addition is 0.3 to 100 weight parts component (b') per 100 weight parts component (a').

Component (c') in the subject condensation reaction-curing silicone composition is a condensation-reaction catalyst whose purpose is to accelerate the condensation reaction between the silanol groups in component (a') and the silicon-bonded hydrogen atoms in component (b'). The condensation-reaction catalyst comprising component (c') is specifically exemplified by the metal salts of organic acids, such as dibutyltin dilaurate, dibutyltin diacetate, tin octanoate, dibutyltin dioctoate, tin laurate, ferric stannooctanoate, lead octanoate, lead laurate, zinc octanoate, and so forth; organotitanium compounds such as tetrabutyl titanate, tetrapropyl titanate, dibutoxytitaniumbis(ethyl acetate), and so forth; and platinum compounds such as chloroplatinic acid, alcohol solutions of chloroplatinic acid, chloroplatinic acid-olefin complexes, chloroplatinic acid-alkenylsiloxane complexes, platinum black, platinum-on-silica, and so forth. No particular restrictions apply to the quantity of component (c') addition as long as it is added in a quantity sufficient to accelerate the curing reaction in the subject condensation reaction-curing silicone composition. An addition in the range of 0.01 to 10 weight parts per 100 weight parts component (a') is specifically preferred.

A filler (d') can be added on an optional basis to the subject condensation reaction-curing silicone composition in order to adjust the fluidity of the composition and/or improve the mechanical strength of the cured silicone powder product. This component (d') is specifically exemplified by reinforcing fillers such as precipitated silica, fumed silica, calcined silica, fumed titanium oxide, and so forth, and by nonreinforcing fillers such as quartz powder, diatomaceous earth, aluminosilicates, iron oxide, zinc oxide, calcium carbonate, and so forth. Component (d') may be added directly to the condensation reaction-curing silicone composition, or it may be added after a preliminary surface treatment with an organosilicon compound such as hexamethyldisilazane, trimethylchlorosilane, polydimethylsiloxane, and so forth.

In order to improve the affinity and adherence between organic resins and the compositions of the invention, the subject condensation reaction-curing silicone composition may optionally contain a silane coupling agent as component (e'). Component (e') is specifically exemplified by
vinyltrimethoxysilane,
vinyltriethoxysilane,
vinyltris(2-methoxyethoxy) silane,
vinyltriacetoxysilane,
3-chloropropyltrimethoxysilane,
3-aminopropyltrimethoxysilane,
3-aminopropyltriethoxysilane,
3-(2-aminoethyl)aminopropyltrimethoxysilane,
3-mercaptopropyltrimethoxysilane,
3-glycidoxypropyltrimethoxysilane,
2-(3,4-epoxycyclohexyl)ethyltrimethoxysilane,
3-methacryloxypropyltrimethoxysilane,
3-aminopropylmethyldimethoxysilane, and
3-glycidoxypropylmethyldimethoxysilane.
Component (e') may be added to the mixing process for components (a'), (b'), and (c') or it may be preliminarily reacted with component (b'). The quantity of component (e') addition to the subject condensation reaction-curing silicone composition is not critical, and component (e') should be added in the particular quantity that provides an excellent affinity between the cured silicone powder product and organic resins. The specifically preferred range is 0.1 to 50 weight parts per 100 weight parts component (a').

Other components that may be added to the subject condensation reaction-curing silicone composition on an optional basis are pigments, heat stabilizers, flame retardants, photosensitizers, and diorganopolysiloxane that carries the silicon-bonded hydroxyl group only at one molecular chain terminal.

A homogeneous water-based emulsion of the curable silicone composition can be prepared by first dispersing the curable silicone composition in water or an aqueous surfactant solution and then subjecting this dispersion to the action of an agitator such as a homogenizer, colloid mill, and so forth, or a mixing device such as an ultrasonic vibrator.

The water-based curable SC emulsion is preferably prepared using surfactant in order to obtain a very stable emulsion in which the curable silicone composition has a small average particle diameter. Surfactant usable for this purpose is specifically exemplified by
nonionic surfactants such as
polyoxyalkylene alkyl ethers,
polyoxyalkylene alkylphenyl ethers,
polyoxyalkylene alkyl esters,
polyoxyalkylene sorbitan esters,
polyethylene glycols,
polypropylene glycols,
diethylene glycol,
the ethylene oxide adducts of trimethylnonanol, and so forth;
anionic surfactants such as
hexylbenzenesulfonic acid,
octylbenzenesulfonic acid,
decylbenzenesulfonic acid,
dodecylbenzenesulfonic acid,
cetylbenzenesulfonic acid,
myristylbenzenesulfonic acid,
the sodium salts of the preceding, and so forth;
and cationic surfactants such as
octyltrimethylammonium hydroxide,
dodecyltrimethylammonium hydroxide,
hexadecyltrimethylammonium hydroxide,
octyldimethylbenzylammonium hydroxide,
decyldimethylbenzylammonium hydroxide,
dioctadecytdimethylammonium hydroxide,
beef tallow trimethylammonium hydroxide,
cocotrimethylammonium hydroxide, and so forth.
These may be used singly or as mixtures of two or more selections. Particularly preferred is the use of two nonionic surfactants chosen such that the HLB of one is less than 10, the HLB of the other is at least 10, and the difference in their HLB values is at least 5. The use of such a surfactant combination yields smaller average particle diameters for the curable silicone composition in the water-based emulsion. The quantity of surfactant addition is not critical, but it is preferably added at 0.1 to 20 weight parts per 100 weight parts curable silicone composition and is particularly preferably added at 0.5 to 8 weight parts per 100 weight parts curable silicone composition.

The amount of water addition is also not specifically restricted. The preferred water addition is 40 to 2,000 weight parts per 100 weight parts curable silicone composition and the particularly preferred water addition is 40 to 1,000 weight parts water per 100 weight parts curable silicone composition. It becomes difficult to form the water-based curable SC emulsion when water is added at less than 40 weight parts per 100 weight parts curable silicone composition. At the other extreme, the use of more than 2,000 weight parts water causes the process for preparing the cured silicone powder to have a poor productivity. The water should have a low content of metal and halogen ions, and conductivity values not exceeding 1 microS/cm are preferred. Ion-exchanged water with a conductivity not exceeding 0.5 microS/cm is particularly preferred.

A water-based dispersion of the cured silicone powder (A) is then produced by curing the curable silicone present in the water-based emulsion whose preparation has been described above. This cure may be effected by allowing said water-based emulsion to stand at room temperature or by heating the water-based emulsion. In the case of heating the water-based curable SC emulsion, the preferred heating temperature should not exceed 100° C., while particularly preferred heating temperatures fall into the range of 40° C. to 95° C. The techniques for heating the water-based curable SC emulsion are exemplified by direct heating of the water-based emulsion and adding the water-based emulsion to hot water.

The average particle diameter of the cured silicone powder (A) prepared as described above must be about 0.1 to about 200 micrometers, and is preferably 0.5 to 80 micrometers. The basis for this range is as follows: the amorphous silica micropowder does not become satisfactorily anchored or immobilized on the surface of cured silicone powder with an average particle diameter below 0.1 micrometer, while the final cured silicone powder composition has a strongly reduced fluidity and dispersibility when the average particle diameter exceeds 200 micrometers.

The preparative process of the invention continues with the addition of amorphous silica micropowder (B) to the water-based dispersion of cured silicone powder (A) in order to prepare a water-based dispersion of components (A) and (B). The component (B) used in the preparative process of the invention must be an amorphous silica micropowder that has an average particle diameter no greater than 1 micrometer and a surface silanol group density of at least 2 silanol groups per 100 square angstroms. When component (B) has a surface silanol group density below 2 silanol groups per 100 square angstroms, the hydrophilicity of this component is diminished to the point that it cannot be homogeneously dispersed and undergoes phase separation when added to the water-based dispersion of the cured silicone powder (A). Component (B) must have an average particle diameter that does not exceed about 1 micrometer, and preferably has an average particle diameter in the range of 0.001 to 0.1 micrometer. Component (B) will not be strongly anchored on the surface of component (A) when the average particle diameter of component (B) exceeds 1 micrometer. The shape of component (B) is not critical, but it is preferably spherical. The amorphous silica micropowder comprising the subject component (B) is exemplified by dry-process, electric arc, and wet-process amorphous silica micropowders. Fumed silica, which is prepared by a dry process, is particularly preferred as component (B).

The silanol group density on the surface of the amorphous silica micropowder (B) can be determined from the specific surface of component (B) and the silanol group titer. The latter value can be determined, for example, by drying component (B) at 120° C. for 3 hours in a vacuum at or below 15 mmHg and then reacting the silanol groups on the surface of component (B) with lithium aluminum hydride and quantitating the evolved hydrogen gas.

The quantity of component (B) addition in the preparative process of the invention is not critical, and it should be added in a quantity appropriate for immobilization on the surface of component (A). In specific terms, component (B) is preferably added at 0.1 to 30 weight parts per 100 weight parts component (A). Component (B) is preferably added at 1 to 15 weight parts when the average particle diameter of component (A) is 0.1 to 10 micrometers, and is preferably added at 0.5 to 10 weight parts when the average particle diameter of component (A) is 10 to 200 micrometers.

No particular restrictions apply in the preparative process of the invention to the technique for mixing the amorphous silica micropowder (B) into the water-based dispersion of cured silicone powder (A). Examples here include the direct addition of component (B) to the water-based dispersion of component (A) and the preliminary preparation of a water-based dispersion of component (B) which is then added to the water-based dispersion of component (A).

After preparation of the water-based dispersion of cured silicone powder (A) and amorphous silica micropowder (B), the preparative process of the invention continues with the heating of said dispersion, which brings about a strong immobilization or anchorage of component (B) on the surface of component (A) through interactions in the water between the silanol groups on the surface of component (B) and the silanol, silicon-bonded hydrogen, and alkoxy on the surface of component (A). No specific restrictions apply in the preparative process of the invention to the temperature for heating the water-based dispersion of components (A) plus (B). The preferred temperature range is 40° C. to 95° C. and the particularly preferred temperature range is 60° C. to 90° C.

The preparative process of the invention concludes with removal of the water from the water-based dispersion of cured silicone powder (A) and amorphous silica micropowder (B) to yield a cured silicone powder that consists of component (A) whose surface carries immobilized component (B). The technique for removing water from the water-based dispersion is not specifically restricted, and the known methods can be used for the present purpose. For example, removal is readily effected through the use of an air or vacuum drier, a forced convection oven, a spray drier, and so forth.

The amorphous silica micropowder (B) is firmly immobilized or anchored on the surface of the cured silicone powder (A) in the cured silicone powder afforded by the preparative process of the invention as described above. As a result, a characteristic feature of this cured silicone powder is that it does not readily shed component (B) even when subjected to shear forces. The strength of the attachment of the amorphous silica micropowder (B) on the surface of the cured silicone powder (A) can be easily determined by application of high shear force to the cured silicone powder product in a medium such as water, organic solvent, etc. The cured silicone powder of the invention exhibits little tendency to aggregate or undergo blocking and contains only very small quantities of secondary aggregates, and it will therefore not produce clogging in hoppers, etc., during storage. Moreover, due to its excellent fluidity and excellent dispersibility in organic resins and organic solvents (i.e., non-silicone systems), this cured silicone powder can be thoroughly dispersed into cosmetics, thermosetting organic resins, and thermoplastic organic resins.

EXAMPLES

The composition of the invention and its preparative process are described in greater detail hereinafter through working examples. The viscosity values reported in the examples were measured at 25° C., and the properties of the cured silicone powder were measured as follows.

Average Particle Diameter

This was measured using an image processor connected to an optical microscope.

Fluidity of the Cured Silicone Powder Composition 50 g of cured silicone powder compostiion (passes 40 mesh) was poured from a height of 20 cm and the angle of repose (i.e., base angle of the cone formed) was measured.

Aggregation of the Cured Silicone Powder Composition

Using an air-jet siever from the Alpine Company, the % on-mesh was measured with a 325 mesh sieve (mesh opening=44 micrometers).

Blocking of the Cured Silicone Powder Composition 100 g of the cured silicone powder composition was placed in a tube with a cross section of 10 cm×10 cm, and a load of 1 kgf was applied from the top. After standing for 2 days, the load was withdrawn and the sample was divided into 10 portions. Using an air-jet siever from the Alpine Company, a 10 g portion of the cured silicone powder composition was passed through 150 mesh (mesh opening= 100 micrometers) over 5 minutes, and the % on-mesh was then measured.

Dispersibility of the Cured Silicone Powder Composition 1 g of cured silicone powder composition and 50 mL toluene were placed in a lid-equipped 100 mL mayonnaise bottle. The bottle was shaken 50 times and thereafter allowed to stand for 10 hours. Aggregates of the cured silicone powder composition were then measured using an image processor connected to an optical microscope.

Silica Separation Ratio for the Cured Silicone Powder Composition 2.0 g of cured silicone powder composition and 100 mL acetone were stirred for 10 minutes at 4,000 rpm in a homomixer, and the cured silicone powder composition was thereafter separated by filtration. The cured silicone powder composition was then washed with acetone, air-dried, and added to 50 mL brine with a specific gravity of 1.3. This was mixed for 10 minutes at 4,000 rpm using a homomixer and then centrifuged. The amount of silica sedimenting as the lower layer was measured, and this weight is reported as a percentage of the silica input for the cured silicone powder composition.

Sodium and Halogen Ion Concentrations in the Cured Silicone Powder Composition 2.0 g of cured silicone powder composition and 50 g ion-exchanged water (conductivity=0.4 microS/cm) were introduced into a pressure cooker and heated at 121° C. for 20 hours in order to extract ionic impurities in the cured silicone powder composition into the water. The sodium and halogen ion concentrations in this aqueous extract were measured by ion chromatography.

Moisture Resistance of Resin-Sealed Semiconductor Devices

A cured silicone powder composition-filled thermosetting epoxy resin was prepared and used to fabricate 20 resin-sealed semiconductor devices (chip size=36 mm², package thickness=2.0 mm). These resin-sealed semiconductor devices were heated for 500 hours at 121° C. under pressure cooker test conditions, and the number of resin-sealed semiconductor devices was then counted in which aluminum interconnects had been broken.

Example 1

The following were blended to homogeneity at −10° C. to give a composition (I): 50 weight parts of dimethylvinylsiloxy-endblocked dimethylpolysiloxane (viscosity=800 centipoise, vinyl equivalent weight=8,000, sodium ion concentration≦2 ppm, halogen ion concentration ≦5 ppm), 11 weight parts of dimethylsiloxane-methylhydrogensiloxane copolymer (viscosity=20 centipoise, sodium ion concentration≦2 ppm, halogen ion concentration≦5 ppm) with the following formula

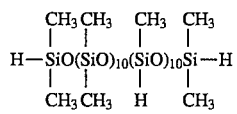

2 weight parts of allyl glycidyl ether, and 2 weight parts of vinylcyclohexene monoxide.

Composition (I) was then blended to homogeneity at 5° C. with 50 weight parts of dimethylvinylsiloxy-endblocked dimethylpolysiloxane as described above and sufficient isopropanolic chloroplatinic acid solution to provide 20 ppm platinum metal based on the total amount of dimethylvinylsiloxy-endblocked dimethylpolysiloxane. Into the resulting blend were rapidly mixed 200 weight parts of pure water at 25° C. (conductivity=0.2 microS/cm) and 4 weight parts polyoxyethylene nonylphenyl ether (HLB=13.1). Passage through a homogenizer (300 kg/cm²) then yielded a homogeneous water-based emulsion of a curable silicone. This water-based curable SC emulsion was held at 30° C. for 6 hours, which resulted in curing of the curable silicone and the production of a water-based cured SP dispersion. 5 weight parts of fumed silica (surface silanol group density= 4.2 silanol groups per 100 square angstroms, primary particle diameter=20 millimicrons) was subsequently added to the water-based cured SP dispersion, which, after dispersing to homogeneity, was then heated for 1 hour at 80° C. The resulting water-based dispersion of cured silicone powder+ fumed silica was dried in a spray drier, and 110 weight parts of a cured silicone powder composition was recovered by cyclone.

Comparative Example 1

The procedure of Example 1 was followed, but in this case substituting the fumed silica used in Example 1 with a dimethyldichlorosilane-hydrophobicized fumed silica (surface silanol group density=1.2 silanol groups per 100 square angstroms, primary particle diameter=20 millimicrons). 105 weight parts of cured silicone powder composition was recovered. When the hydrophobicized fumed silica was added in this case to the water-based cured SP dispersion, the silica floated on the surface of the water-based dispersion and a homogeneous dispersion could not be prepared. In addition, the hydrophobicized fumed silica could not be recovered by cyclone during spray drying of the water-based dispersion of cured silicone powder+hydrophobicized fumed silica. Rather, a micropowder that was discharged in the form of a white cloud was collected using a Venturi scrubber, and this was confirmed to the hydrophobicized fumed silica.

Comparative Example 2

The procedure of Example 1 was followed, but in this case adding the fumed silica to the water-based curable SC emulsion in order to prepare a water-based emulsion of curable silicone+fumed silica. This water-based emulsion was held for 7 hours at 25° C. and processing in the spray drier was then attempted; however, uncured curable silicone composition had sedimented and drying could not be carried out.

Example 2

A curable silicone was prepared from 50 weight parts of dimethylvinylsiloxy-endblocked dimethylpolysiloxane (viscosity= 400 centipoise, vinyl equivalent weight=5,400, sodium ion concentration≦2 ppm, halogen ion concentration≦5 ppm), 1.5 weight parts of trimethylsiloxy-endblocked methylhydrogenpolysiloxane (viscosity=20 centipoise, silicon-bonded hydrogen equivalent weight=67, sodium ion concentration ≦2 ppm, halogen ion concentration≦5 ppm), 7.5×10$^{-3}$ weight parts of tetramethyltetravinylcyclotetrasiloxane, and sufficient isopropanolic chloroplatinic acid solution to provide 120 ppm platinum metal based on the total weight of the dimethylvinylsiloxy-endblocked dimethylpolysiloxane. 0.25 weight parts of polyoxyethylene nonylphenyl ether (HLB=5.7) was added to this curable silicone mixture. Into the resulting mixture was then dripped, over a period of approximately 5 minutes while stirring, an aqueous solution composed of 1 weight part polyoxyethylene octylphenyl ether (HLB=18.1) and 10 weight parts pure water with a conductivity of 0.2 microS/cm. After stirring for approximately 1 hour at 600 rpm, the mixture was passed through a colloid mill to produce a thick water-based emulsion of a curable liquid silicone. A homogeneous water-based emulsion of the curable liquid silicone was then prepared by the addition of the aforesaid emulsion while stirring to sufficient pure water to yield a 50 weight % silicone component. The curable silicone was cured by holding the water-based curable SC emulsion overnight, thereby yielding a water-based cured SP dispersion. 50 weight parts of 10% water-based dispersion of fumed silica (surface silanol group density=4.2 silanol groups per 100 square angstroms, primary particle diameter=20 millimicrons) was added to the water-based cured SP dispersion with stirring to homogeneity. Heating for 1 hour at 70° C. then yielded a water-based dispersion of cured silicone powder+fumed silica. This dispersion was dried in a spray drier, as a result of which approximately 58 weight parts cured silicone powder composition was recovered by cyclone.

Comparative Example 3

A cured silicone powder composition was prepared as in Example 2, but in this case omitting the fumed silica that was used in Example 2.

Comparative Example 4

50 weight parts of cured silicone powder was prepared by the procedure in Example 2, but in this case replacing the fumed silica used in Example 2 with 27 weight parts colloidal silica (concentration=20 weight %, average particle diameter= 30 millimicrons, sodium ion concentration= 0.03%).

Example 3

A curable silicone composition was prepared from 50 weight parts of silanol-endblocked dimethylpolysiloxane (viscosity=40 centipoise, hydroxyl equivalent weight=450, sodium ion concentration≦2 ppm, halogen ion concentration≦5 ppm), 4.0 weight parts of trimethylsiloxy-endblocked methylhydrogenpolysiloxane (viscosity=20 centipoise, silicon-bonded hydrogen equivalent weight=67, sodium ion concentration ≦2 ppm, halogen ion concentration≦5 ppm), and 0.75 weight parts dibutyltin dilaurate. While maintaining this curable silicone composition at 10° C., it was mixed into 250 weight parts pure water (conductivity=0.2 microS/cm) and 3 weight parts polyoxyethylene nonylphenyl ether (HLB=13.1), and the resulting mixture was passed through a homogenizer to yield a homogeneous water-based emulsion of the curable silicone composition. The water-based curable SC emulsion was held at 25° C. for 10 hours in order to cure the curable silicone composition, thereby yielding the water-based dispersion of a cured silicone powder. 8 weight parts of fumed silica (surface silanol group density=2.5 silanol groups per 100 square angstroms, primary particle diameter=10 millimicrons) was added to this water-based cured SP dispersion with stirring to homogeneity. Heating at 60° C. for 30 minutes gave a water-based dispersion of cured silicone powder+fumed silica. Drying this water-based dispersion of cured silicone powder+fumed silica in a spray drier resulted in the recovery by cyclone of approximately 55 weight parts of a cured silicone powder composition.

Comparative Example 5

(Corresponds to Comparative Example 2 from Japanese Laid Open Patent Application Number Hei 4-348143)

A water-based curable SC emulsion was prepared as in Example 1. The direct addition of 500 weight parts of hot water (90° C.) to this emulsion and standing for a day at room temperature yielded the water-based dispersion of a cured silicone powder. 1.1 weight parts of fumed silica as described in Example 1 was mixed to homogeneity into this water-based cured SP dispersion to yield a dispersion of cured silicone powder+ fumed silica. This water-based dispersion was then dried in a spray drier and a cured silicone powder was recovered by cyclone. During this process white smoke composed of the fumed silica was observed coming from the bag filter.

Comparative Example 6

A cured silicone powder was prepared as in Example 1, but in this case without using the fumed silica that was used in Example 1. 5 weight parts of fumed silica as described in Example 1 was added to this cured silicone powder, and mixing to homogeneity in a Henschel mixer then yielded a cured silicone powder composition.

Application Example 1

The following were mixed to homogeneity on a two-roll mill at 90° C.: 75 weight parts of ortho-cresol novolac epoxy resin (softening point=80° C., epoxy equivalent weight= 220), 26 weight parts of the cured silicone powder composition prepared in Example 1, 260 weight parts of fused silica, 1 weight part carnauba wax, 35 weight parts of phenol novolac resin, 0.6 weight parts of triphenylphosphine, and 0.5 weight parts of 3-glycidylpropyltrimethoxysilane. This blend was then ground to yield a curable epoxy resin composition. The cured silicone powder composition was uniformly dispersed in the curable epoxy resin composition. The curable epoxy resin composition was then used to fabricate 20 resin-sealed semiconductor devices. The moisture resistance of these resin-sealed semiconductor devices was rated as excellent and there were no failures found (0/20).

Application Example 2

A curable epoxy resin composition was prepared as in Application Example 1, but in this case using the cured silicone powder composition prepared in Comparative Example 4 in place of the cured silicone powder composition of Example 1. It was determined that this curable epoxy resin composition contained aggregates of the cured silicone powder composition. The curable epoxy resin composition was then used to fabricate 20 resin-sealed semiconductor devices. The moisture resistance of these resin-sealed semiconductor devices was rated as poor and there were 18 failures (18/20).

The test results of the examples and comparative examples are presented in Table 1.

TABLE I

|  | Invention Examples | | | Comparative Examples | | | | |
| --- | --- | --- | --- | --- | --- | --- | --- | --- |
|  | Example 1 | Example 2 | Example 3 | Comp. Ex. 1 | Comp. Ex. 3 | Comp. Ex. 4 | Comp. Ex. 5 | Comp. Ex. 6 |
| average particle diameter (micrometers) | 3 | 1 | 2 | 3 | 1.5 | 4 | 3 | 3 |
| angle of repose (degrees) | 32 | 34 | 30 | 55 | 61 | 32 | 43 | 32 |
| aggregation (%) | <0.1 | <0.1 | <0.1 | 52 | 58 | <0.1 | 34 | 21 |
| blocking (%) | 0.1 | 0.1 | 0.1 | 2 | 90 | 5 | 75 | 12 |
| dispersibility (mm) | <0.5 | <0.5 | <0.5 | 5 | 9 | <0.5 | 6 | 5 |
| silica separation ratio (%) | 11 | 5 | 2 | 99–100 | — | 85 | 95 | 98 |
| sodium ion concentration (ppm) | 0.3 | 0.5 | 1.0 | 0.8 | 0.5 | 35 | 0.3 | 0.3 |
| halogen ion concentration (ppm) | 5 | 7 | 10 | 10 | 8 | 17 | 5 | 5 |

That which is claimed is:

1. A composition prepared by a process comprising:

(I) preparing a water-based dispersion of
      (A) a cured silicone powder having an average particle diameter of 0.1 to 200 micrometers and
      (B) an amorphous silica micropowder having an average particle diameter of ≦1 micrometer and a surface silanol group density of at least 2 silanol groups per 100 square angstroms;

(II) heating said water-based dispersion; and (III) removing the water from said dispersion, wherein said silica micropowder is immobilized on the surface of said cured silicone powder.

2. The composition according to claim 1, wherein said powder (A) has an average particle diameter of 0.1 to 10 micrometers and from 1 to 15 parts by weight of said silica micropowder (B) is present for each 100 parts by weight of said powder (A).

3. The composition according to claim 1, wherein said powder (A) has an average particle diameter of 10 to 200 micrometers and from 0.5 to 10 parts by weight of said silica micropowder (B) is present for each 100 parts by weight of said powder (A).

4. The composition according to claim 1, wherein said powder (A) is a cured polydimethylsiloxane powder.

5. The composition according to claim 1, wherein said powder (A) is prepared from an addition reaction-curing silicone composition comprising (a) an organopolysiloxane having at least 2 alkenyl groups in each molecule, (b) an organohydrogenpolysiloxane having at least 2 silicon-bonded hydrogen atoms in each molecule, (c) a platinum catalyst, optionally, (d) a filler and, optionally, (e) a compound selected from the group consisting of an epoxy-functional organic compound and an aryl group-containing organic compound.

6. The composition according to claim 5, wherein the organic groups of said components (a) and (b) are methyl radicals.

7. The composition according to claim 1, wherein said powder (A) is prepared from a condensation reaction-curing silicone composition comprising (a') a silanol-endblocked organopolysiloxane, (b') an organohydrogenpolysiloxane having at least 2 silicon-bonded hydrogen atoms in each molecule, and (c') a condensation-reaction catalyst, optionally, (d') a filler and, optionally, (e') a silane coupling agent.

8. The composition according to claim 7, wherein the organic groups of said components (a') and (b') are methyl radicals.

9. The composition according to claim 1, further comprising an organic resin.

10. The composition according to claim 9, wherein said organic resin is an epoxy resin.

11. A process for preparing a cured silicone powder composition comprising:

(I) preparing a water-based dispersion of
      (A) a cured silicone powder having an average particle diameter of 0.1 to 200 micrometers and
      (B) an amorphous silica micropowder that has an average particle diameter not exceeding 1 micrometer and a surface silanol group density of at least 2 silanol groups per 100 square angstroms;

(II) heating said water-based dispersion; and (III) removing the water from said dispersion.

12. The process according to claim 11, wherein said powder (A) is a cured polydimethylsiloxane.

13. The process according to claim 12, wherein 0.1 to 30 parts by weight of said silica micropowder (B) are present for each 100 parts by weight of said cured silicone powder (A).

14. The process according to claim 11, wherein said powder (A) has an average particle diameter of 0.1 to 10 micrometers and from 1 to 15 parts by weight of said silica micropowder (B) is present for each 100 parts by weight of said powder (A).

15. The process according to claim 11, wherein said powder (A) has an average particle diameter of 10 to 200 micrometers and from 0.5 to 10 parts by weight of said silica micropowder (B) is present for each 100 parts by weight of said powder (A).

16. The process according to claim 11, wherein said powder (A) is prepared from an addition reaction-curing silicone composition comprising (a) an organopolysiloxane having at least 2 alkenyl groups in each molecule, (b) an organohydrogenpolysiloxane having at least 2 silicon-bonded hydrogen atoms in each molecule, (c) a platinum catalyst and, optionally, (d) a filler and (e) a compound selected from the group consisting of an epoxy-functional organic compound and an aryl group-containing organic compound.

17. The process according to claim 16, wherein the organic groups of said components (a) and (b) are methyl radicals.

18. The process according to claim 11, wherein said powder (A) is prepared from a condensation reaction-curing silicone composition comprising (a') a silanol-endblocked organopolysiloxane, (b') an organohydrogenpolysiloxane having at least 2 silicon-bonded hydrogen atoms in each molecule, and (c') a condensation-reaction catalyst, and optionally, (d') a filler and (e') a silane coupling agent.

19. The process according to claim 18, wherein the organic groups of said components (a') and (b') are methyl radicals.

* * * * *